(12) United States Patent
Testani et al.

(10) Patent No.: US 10,678,286 B2
(45) Date of Patent: *Jun. 9, 2020

(54) POWER CONTROL DEVICE WITH CALIBRATION FEATURES

(71) Applicant: Pass & Seymour, Inc., Syracuse, NY (US)

(72) Inventors: Anthony M. Testani, Syracuse, NY (US); Brian Mueller, Corland, NY (US)

(73) Assignee: Pass & Seymour, Inc., Syracuse, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/004,981

(22) Filed: Jun. 11, 2018

(65) Prior Publication Data

US 2018/0292855 A1 Oct. 11, 2018

Related U.S. Application Data

(63) Continuation of application No. 14/229,389, filed on Mar. 28, 2014, now Pat. No. 9,996,096.

(51) Int. Cl.
*G05F 3/04* (2006.01)
*H02M 7/06* (2006.01)
(Continued)

(52) U.S. Cl.
CPC .............. *G05F 3/04* (2013.01); *H01H 23/168* (2013.01); *H02M 7/06* (2013.01); *H05B 39/044* (2013.01);
(Continued)

(58) Field of Classification Search
CPC ......... G05F 3/04; H05B 39/044; H05B 37/02; H05B 37/04; H05B 37/00; H02J 7/34
(Continued)

(56) References Cited

U.S. PATENT DOCUMENTS

| 6,211,627 B1* | 4/2001 | Callahan | H05B 37/02 315/199 |
| 2004/0212324 A1* | 10/2004 | Callahan | H05B 37/02 315/312 |

(Continued)

*Primary Examiner* — Pinping Sun
*Assistant Examiner* — Jagdeep S Dhillon
(74) *Attorney, Agent, or Firm* — Bond, Schoeneck & King, PLLC; Frederick Price; George McGuire

(57) ABSTRACT

The present invention is directed to an electrical wiring device that includes a housing assembly having a plurality of terminals at least partially disposed therein, the plurality of terminals being configured to be coupled to an AC power source and at least one electrical load, the plurality of terminals being configured to provide the electrical wiring device with regulated AC power in a device energized state. At least one variable control mechanism is coupled to the housing assembly, the at least one variable control mechanism being configured to regulate power to the at least one electrical load by way of a control knob being user settable between a first adjustment stop and a second adjustment stop. A user accessible calibration button is included. At least one series pass element coupled to the at least one variable control mechanism, the at least one series pass element being configured to provide load power to the at least one electrical load in accordance with a user setting of the control knob. A regulation circuit is coupled to the user accessible calibration button and the at least one series pass element, the regulation circuit being configured to enter a calibration mode when the control knob is at or near the first adjustment stop or the second adjustment stop and the user manually actuates the calibration button, the regulation circuit establishing at least one pre-determined load power setting when the calibration button is actuated when the regulation circuit is in the calibration mode.

71 Claims, 7 Drawing Sheets

(51) Int. Cl.
*H05B 39/04* (2006.01)
*H05B 37/02* (2006.01)
*H01H 23/16* (2006.01)

(52) U.S. Cl.
CPC ............. *H05B 37/02* (2013.01); *Y02B 20/146* (2013.01); *Y10T 307/406* (2015.04)

(58) Field of Classification Search
USPC ............... 307/31, 25, 39, 43, 66, 64, 80, 82; 315/297, 292, 294, 312; 257/99, 98, 100; 438/27, 29
See application file for complete search history.

(56) References Cited

U.S. PATENT DOCUMENTS

| | | | |
|---|---|---|---|
| 2006/0022214 A1* | 2/2006 | Morgan | F21K 9/00 257/99 |
| 2012/0068623 A1* | 3/2012 | Savicki, Jr. | H01R 13/652 315/297 |
| 2012/0080944 A1* | 4/2012 | Recker | H05B 37/0281 307/25 |

* cited by examiner

POWER CONTROL DEVICE WITH CALIBRATION FEATURES

CROSS-REFERENCE TO RELATED APPLICATION

The present application relates and claims priority to U.S. patent application Ser. No. 14/229,389 filed Mar. 28, 2014, the entirety of which is hereby incorporated by reference.

BACKGROUND OF THE INVENTION

1. Field of the Invention

The present invention relates generally to electrical wiring devices, and particularly to power control wiring devices such as dimmer and fan speed control devices.

2. Technical Background

In most residences, a simple ON/OFF switch may be the primary way people control lighting fixtures or air-circulating fan fixtures. One obvious drawback to using simple ON/OFF switches to control these devices is experienced when it comes time to pay the electric bill—a given light (or fan) is either ON or OFF—a simple switch is thus unable to vary the amount of light (and hence the amount of power consumed). Stated differently, by controlling light intensity or fan speed in accordance with needed or desired parameters, electricity usage is reduced, saving money and natural resources. In accordance with the present invention, therefore, a power control device refers to an electrical control device that may be employed to adjust the amount of current delivered to any variable electrical load, such as a light or motor. The adjustment is achieved by sliding a lever or rotating a dial.

When the electric load is a lighting device, the power control device is commonly referred to as a dimmer. For example, when a light is dimmed 25%, a dimmer saves about 20% of the electricity required. When dimmed by 50%, it saves 40% of the electricity. Second, a dimmer greatly extends lamp life because it reduces strain on the filament. When dimmed 20%, a lamp lasts 4 times longer than it would at full power, and dimmed by 50%, it will last as much as 20 times longer. If the power control device is configured to control a motor, such as a fan motor, the power control device is configured to control a motor, such as a fan motor, the power control device is referred to as a motor speed control. Motor speed controllers are also used to control the speed of machinery, such as power tools, electrical drills, chair lifts, stationary machinery, and other such variable motor driven elements.

Power control devices are typically packaged in a wiring device form factor for installation in a wall outlet box. The wiring device may include one or more power control devices within the device housing. For example, wiring devices that are equipped with both fan motor and lighting control features are ubiquitous. The wiring device may include another power control device such as a switch, protective device, ground fault circuit interrupter (GFCI), arc fault circuit interrupter (AFCI), surge protective device (SPD), occupancy sensor, or receptacle. When a switch is included, it may be wired in series with the dimmer or fan speed control to allow the load to be switched ON or OFF. The conventional wiring device form factor provides a user accessible interface that includes one or more switch mechanisms such as buttons, levers, dials, slide switches, and other such input control mechanisms that permit a user to vary the power to a load or turn it ON/OFF.

Prior to device installation, wiring from the AC power source and wiring to the load(s) are disposed inside the outlet box. The outlet box is usually located proximate to the load being controlled. The device is installed by connecting the wiring inside the outlet box to the appropriate wiring device terminals disposed on the exterior of the wiring device. The power control wiring device is then inserted into the outlet box and attached to the outlet box using one or more fasteners. A cover plate is installed to complete the installation.

Turning now to so-called "green" issues, the public has developed an increased awareness of the impact that energy generation has on the environment. Moreover, as the economics of countries such as Brazil, India, China, etc. improve and develop, their need for energy resources increases accordingly. As such, the global demand for energy has risen sharply, while the supply of planet earth's resources remains fixed. In light of the pressures of supply and demand, the cost of energy resources will only increase. There is thus a need to use limited energy resources more wisely and more efficiently. More efficient light sources and electrical fixtures have been developed to replace the conventional incandescent lighting devices in response to this need. For example, compact fluorescent lights (CFL) and light emitting diode (LED) devices are far more efficient than conventional incandescent lights and thus provide homeowners/tenants with an acceptable level of service while using less energy and incurring lower costs. This may complicate matters somewhat since incandescent lights, fluorescent lights, MLV lighting, CFL devices and LED lighting may have different electrical operating characteristics.

Thus, one of the drawbacks of a conventional dimmer device is that it may not be compatible with all of the types of lighting devices currently available. The minimum range of adjustment of the dimmer may be fine for one type of light source but cause another type to flicker. The maximum range of adjustment of a conventional dimmer may satisfactorily limit the energy usage for one type of light source but not for another. Conventional fan motor controls have similar issues in that they are not compatible with all the various fan motors currently on the market.

Moreover, the typical user may want to adjust the operating range of his fan motor or dimmer in accordance with their personal needs and preferences. Some conventional dimmers and fan speed controls have calibration devices that allow the user to set the minimum range of adjustment or the maximum range of adjustment using a trim potentiometer, but not both. Conventional dimmers cannot calibrate both the high end and the low end because trim potentiometers are expensive and bulky; fitting in two potentiometers, one each for the high and low calibration is prohibitive from both a cost and space standpoint. Furthermore, trim potentiometers require large access holes through the device's heat sink and, thus, the effectiveness of the heat sink is diminished. Once again, using two trim pots is prohibitive, this time from a safety standpoint.

Accordingly, a need exists for a safe, cost-effective and economic power control device that lets the user calibrate the dimmer device to a variety of electrical loads over a wide range of power settings.

SUMMARY OF THE INVENTION

The present invention addresses the needs described above by providing an economical power control device that lets the user calibrate the device to a variety of electrical loads over a wide range of power settings.

One aspect of the present invention is directed to an electrical wiring device that includes a housing assembly having a plurality of terminals at least partially disposed therein, the plurality of terminals being configured to be coupled to an AC power source and at least one electrical load, the plurality of terminals being configured to provide the electrical wiring device with regulated AC power in a device energized state. At least one variable control mechanism is coupled to the housing assembly, the at least one variable control mechanism being configured to regulate power to the at least one electrical load by way of a control knob being user settable between a first adjustment stop and a second adjustment stop. A user accessible calibration button is included. At least one series pass element coupled to the at least one variable control mechanism, the at least one series pass element being configured to provide load power to the at least one electrical load in accordance with a user setting of the control knob. A regulation circuit is coupled to the user accessible calibration button and the at least one series pass element, the regulation circuit being configured to enter a calibration mode when the control knob is at or near the first adjustment stop or the second adjustment stop and the user manually actuates the calibration button, the regulation circuit establishing at least one pre-determined load power setting when the calibration button is actuated when the regulation circuit is in the calibration mode.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1A:
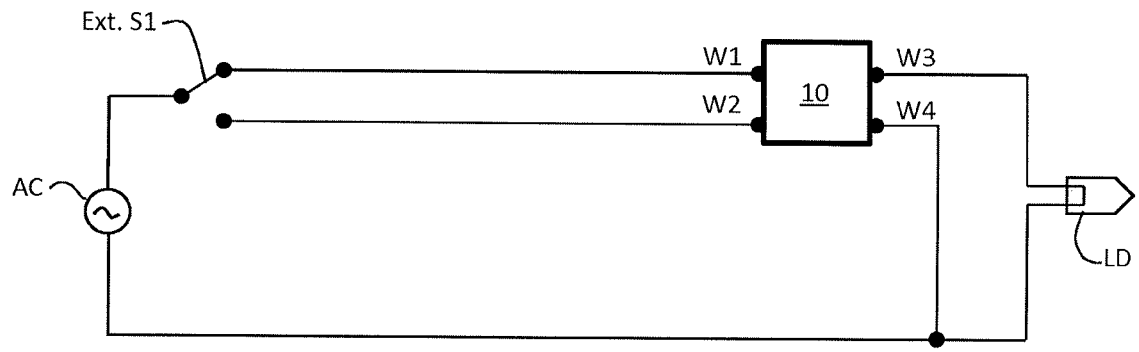
FIGS. 1A and 1B are diagrammatic depictions of three-way switch arrangements in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the power control device of the present invention is shown in FIG. 1, and is designated generally throughout by reference numeral 10.

Figure 1B:
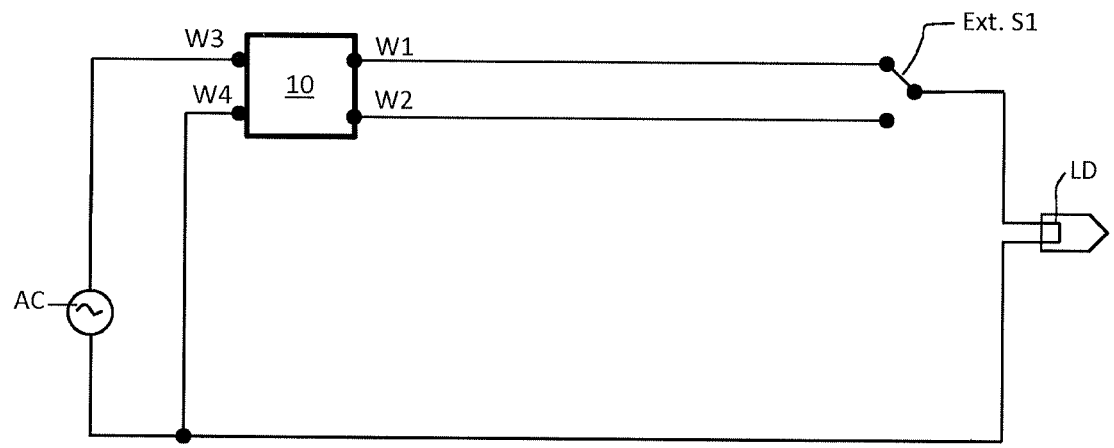

As embodied herein and depicted in FIGS. 1A and 1B, diagrammatic depictions of a three-way switch arrangement in accordance with the present invention are disclosed. FIG. 1A shows a typical three-way switch arrangement wherein the AC line voltage (e.g., 120 VAC) is connected to the pole of a first SPDT switch S1 and the load is connected to the power control device 10 of the present invention. Specifically, the traveler wires of the three-way wiring installation are connected between the two throws of the conventional switch S1 and the terminals W1 and W2. The load LD is connected between the remaining two terminals of power control device 10, W3 and W4. Note that in FIG. 1B, the positions of the switches/power control devices are reversed. Accordingly, the power control device 10 of the present invention may be employed in either position of a three-way switch arrangement.

Figure 2A:
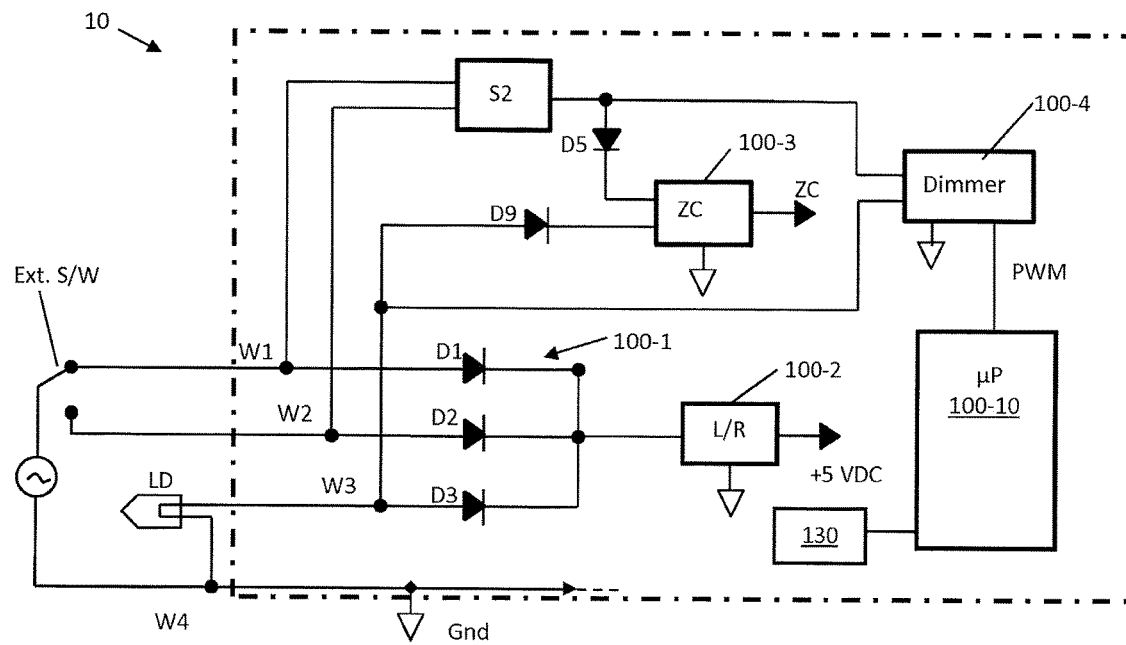
FIGS. 2A and 2B are detailed block diagrams of the present invention in the three-way switch arrangements depicted in FIGS. 1A and 1B.
Figure 2B:
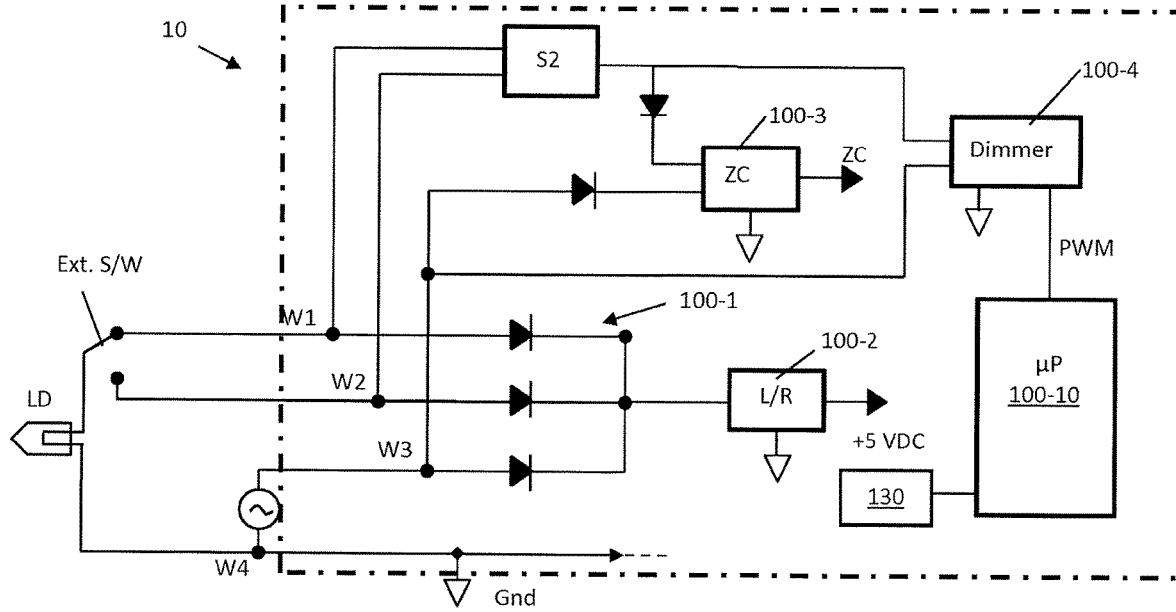

Referring to FIGS. 2A and 2B, detailed block diagrams of the present invention in the three-way switch arrangements depicted in FIGS. 1A and 1B are disclosed. FIG. 2A is a detail diagram of the arrangement depicted in FIG. 1A. As before, the pole of the SPDT external switch is connected to AC power and the two traveler wires are connected between the two throws of the SPDT switch and the terminals W1 and W2. Moreover, the load LD, characterized in FIG. 2A as a lighting load, is connected between terminals W3 and W4. Terminal W4 is always connected to the neutral wire of the premise wiring installation. In reference to the interior of the device 10, terminals W1, W2, and W3 are coupled to power supply 100-1. In particular, each terminal (W1, W2, and W3) is connected to its respective diode (D1, D2, and D3). The output of the power supply 100-1 is provided to the linear regulator circuit 100-2, which is configured to provide +5 VDC to the circuitry that requires a DC power supply (e.g., microprocessor 100-10). The terminals W1 and W2 are connected to the throws of SPDT switch S2, which is controlled by the user via a switch actuator (i.e., see switch 30 at FIG. 4 or switch at FIG. 5). To be clear, the external switch (S1) and the switch S2 provide the three-way switching functionality. In any event, the pole of the SPDT switch S2 is connected to the dimmer 100-4. The output of the dimmer, i.e., the regulated power, is provided to the load LD via terminal W3. Note that the pole of the SPDT switch S2 is also connected to the zero-cross (ZC) detector 100-3. The ZC detector 100-3 provides the microprocessor 100-10 with a ZC detection signal that indicates the 0° and 180° phase position of the AC signal.

FIG. 2B is a detail diagram of the arrangement depicted in FIG. 1B. Here, the pole of the SPDT external switch is connected to the load LD and the two traveler wires are connected between the two throws of the SPDT switch and the terminals W1 and W2. The AC power source is connected between terminals W3 and W4. Terminal W4 is again connected to the neutral wire of the premise wiring installation. In this arrangement, the AC power is provided to the dimmer 100-4 via terminal W3 and diode D3. The regulated power is provided to the load via terminal W1. The user can actuate switch S2 to turn the power off (by directing the regulated power to terminal W2). At the other end of the three-way switching arrangement, if one actuates switch S1 (Ext. S/W) after switch S2 is actuated, regulated power is again provided to the load LD.

Figure 3:
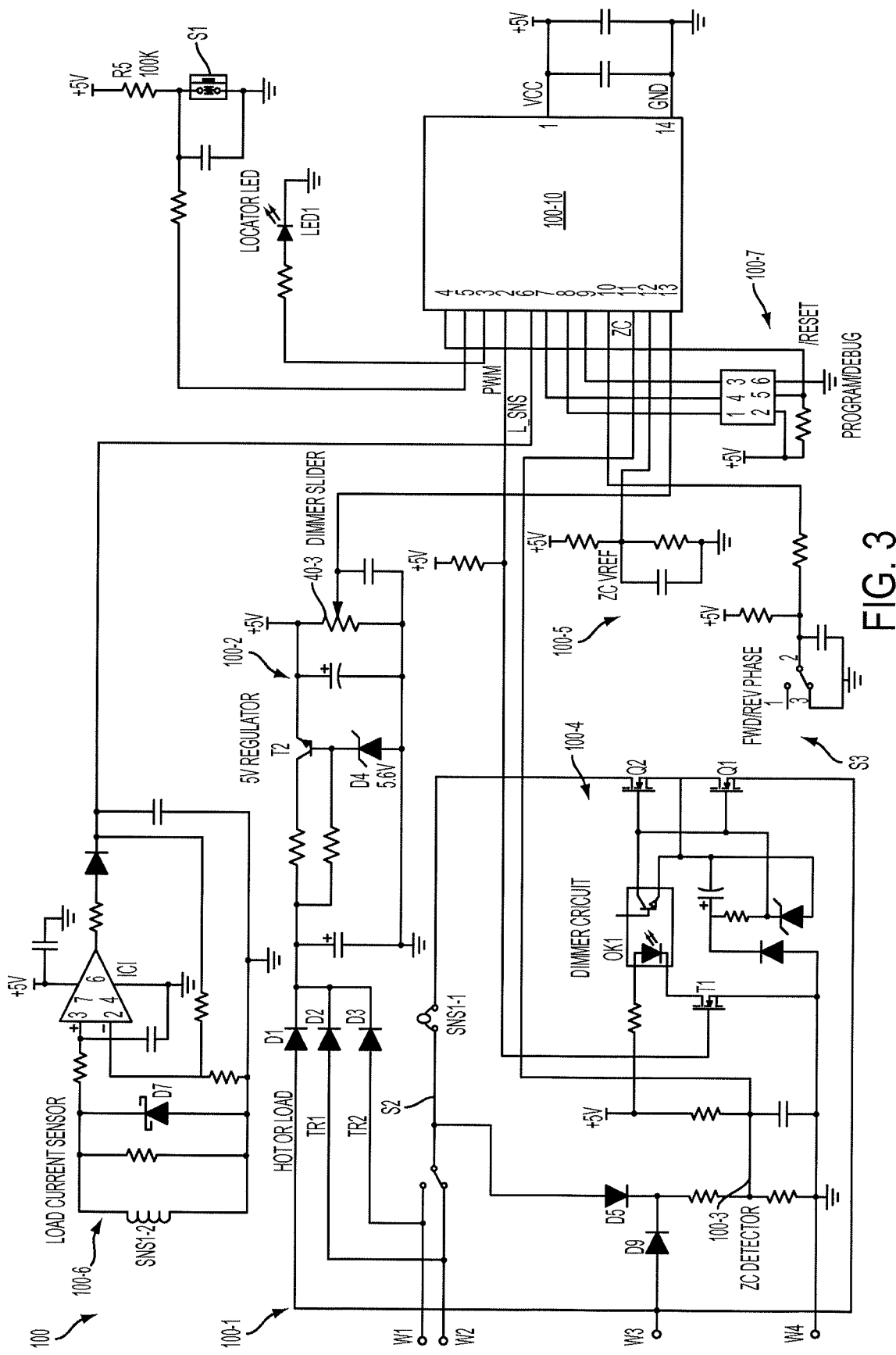
FIG. 3 is a detailed circuit diagram in accordance with one embodiment of the present invention.

As embodied herein and depicted in FIG. 3, a detailed circuit diagram in accordance with one embodiment of the present invention is disclosed. The power supply 100-1 includes diodes D1-D3 are disposed in parallel with each other such that the AC power signal may be provided to the power supply via terminals W1, W2 or W3. The power control device 10 may therefore be placed in either switch position of a retrofit three-way switch arrangement. The rectified signal is then provided to the regulator circuit 100-2 comprising transistor T2 and zener diode D4 which is configured to provide a +5 VDC power supply for the digital components.

A slide potentiometer 40-3 is coupled to the +5 VDC supply and is used in conjunction with the internal calibration switch S1 and the locator LED to effect the HIGH/LOW calibration routine. These routines are described in detail below and depicted in FIGS. 6 and 7.

The zero cross detector 100-3 is also coupled to the power supply 100-1 and provided with a half-wave rectified DC signal via diode D5 (terminals W1 or W2) or diode D9 (W3) such that the zero cross detector 20-2 provides a zero cross (ZC) signal to the microprocessor 100-10. The zero cross signal (ZC) is paired with the ZC VREF circuit 100-5 to provide a differential input to a differential comparator disposed inside the microcomputer 100-10. The differential signal eliminates common-mode noise to prevent any false zero cross detections by the microcomputer 100-10.

Before discussing the dimmer circuit, the reader should take note of the phase selection switch S3. This switch S3 is employed by the user to place the device 10 in a forward phase mode or reverse phase mode, depending on the type of load LD being used in the three-way arrangement. As those skilled in the art will appreciate, forward phase control is appropriate for conventional incandescent lighting, magnetic low voltage (MLV) lighting fixtures, conventional fluorescent lighting fixtures employing electronic ballasts (EFL), and halogen lighting. Reverse phase control is generally appropriate for electronic low voltage (ELV) lighting. Bulbs designed as higher efficiency 120V incandescent replacements, including LED bulbs and compact florescent lights (CFL) typically perform better with forward phase control.

As described above, the dimmer circuit 100-4 is coupled between the pole of the SPDT switch S2 and the hot/load terminal W3. The microcomputer 100-10 controls the dimmer circuit 30 by providing a pulse width modulation (PWM) signal to the gate of transistor T1. The PWM signal propagates at logic levels (+5V, GND) and controls the operation of transistor T1; at least one pulse is provided for each AC line cycle. The width of the PWM pulse is varied to control the amount of power provided to the load, whether a lamp load or a motor load. The use of PWM in conjunction with switch S3, allows device 10 to control any type of lighting load by varying the duty cycle of the pulse. In operation, when the PWM signal is high, the transistor T1 conducts through the OK1 to turn transistors Q1 and Q2 ON in accordance with the timing provided by the PWM signal. For the MOSFET implementation shown herein, two transistors (Q1, Q2) are required for operation. This is due to the internal body diode inherent in MOSFET technology; one MOSFET blocks a portion of the positive AC half cycle, and the other blocks a portion of the negative half-cycle to the load.

The timing of the PWM pulse is of course controlled by the microcomputer 100-10 and it is timed relative to the zero crossing of the AC cycle. As noted above, dimming is accomplished in the forward phase by switching the load current ON sometime after the zero-crossing of the AC half-cycle and turned OFF at the next zero-crossing of the AC waveform. Conversely, in reverse phase control, the load current is turned ON when the zero-crossing is detected and turned OFF sometime before the next zero-crossing is detected. Based on the switch S3 setting, the dimmer circuit 100-4 can operate in forward phase when the load LD is implemented by ELV, CFL and LED devices. In one embodiment, the microcontroller 100-10 transmits the PWM signal at a very low duty cycle until the I SNS AMP OUT signal (from the load current detector 112) indicates that there is a load current being drawn. If the fixture is an incandescent one, the load current in this region is substantially linear with respect to the PWM duty cycle. If the fixture is an LED fixture, the load current will not be present until the duty cycle has been increased to a certain threshold. Stated differently, the present invention employs a control loop that optimizes the PWM duty cycle for any given lighting load.

Device 10 may include a load sensor detection circuit 100-6 that includes a load sensor SNS1-2 coupled to an Op Amp IC1. Circuit 100-6 provides the L_SNS signal to the microprocessor 100-10. In one embodiment, the detector 100-6 is configured as a threshold detector that compares the I SNS signal from the SNS sensor with a predetermined threshold value and provides a logic one (+5V) or a logic zero (0 V) signal to processor 100-10. For example, if the load current is greater than about 10 mA, the detector 112-1 is configured to provide a logic one (+5V) signal. If the load current is below the threshold a logic zero (0 V) is provided. Those skilled in the art will appreciate that the threshold level is adjustable and depends on the level of sensitivity desired and the type of load.

The processor circuit 100-10 is implemented using a microcomputer which is selected based on a combination of characteristics including performance, cost, size and power consumption. In other words, the present invention contemplates a variety of models that provide the consumer with options that are closely suited to the consumers' needs and desires. The term "microcomputer performance" refers to an optimal combination of processing speed, memory size, I/O pin capability, and peripheral set capabilities (e.g., A/D converter, comparators, timers, serial bus, etc). As those skilled in the art will appreciate, any suitable processing device may be employed. In one embodiment of the present invention, the microcomputer is implemented by a device known as the "ATtiny44a", which is manufactured by the Atmel Corporation. In another embodiment that includes more features, the microcomputer is implemented using Atmel's "ATtiny84a" because the latter device offers more program memory than the former (i.e., 44a). Specifically, the ATtiny 84a includes 8 kB of program memory whereas the ATtiny 44a includes 4 kB of program memory. In one embodiment, the central processing unit (CPU) is operated at a clock frequency that is well below its rated frequency to thereby minimize power consumption.

It will be apparent to those of skilled in the pertinent art that modifications and variations can be made to the processor circuit 100-10 of the present invention depending on the amount and sophistication of features that are provided to the user. As noted previously, any suitable arrangement of hardware and/or software may be employed given the constraints of being disposed in an electrical wiring device. Thus, processor circuit 110 may be implemented using general purpose processors, signal processors, RISC computers, application specific integrated circuits (ASICs), field programmable gate array (FPGA) devices, customized integrated circuits and/or a combination thereof. With respect to the microcomputer 110-1 depicted in FIG. 3, any suitable microcomputer may be employed including, but not limited to those selected from the Microchip PIC12F family, the Freescale HC08 family, the Texas Instruments MSP430 family, or the ST Micro STM8 family.

Figure 4:
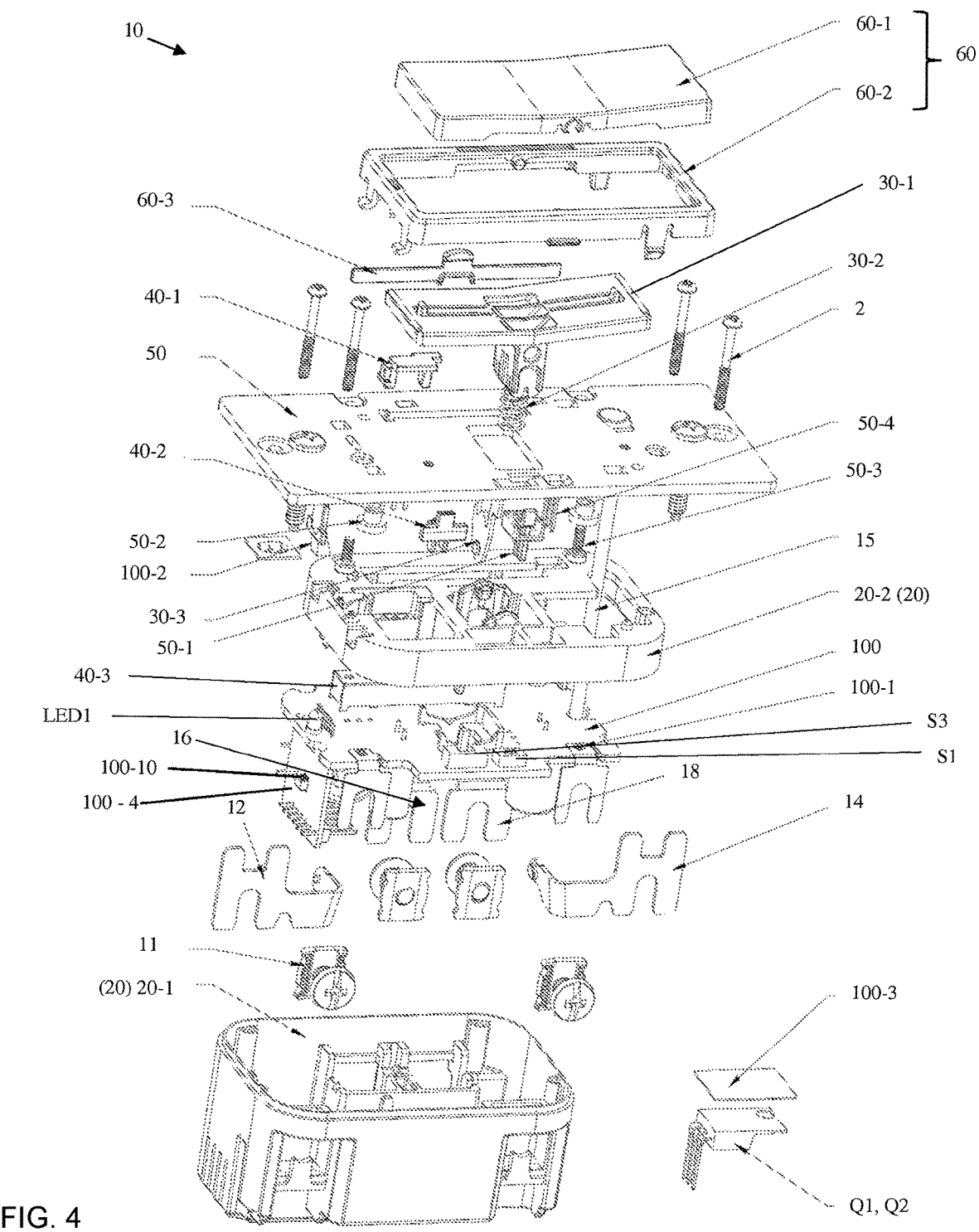
FIG. 4 is an exploded view of the power control device depicted in FIGS. 1-3.

As embodied here and depicted in FIG. 4, an exploded view of the power control device 10 in accordance with the present invention is disclosed. Device 10 includes a device housing 20 that includes back body 20-1, middle housing 20-2, and a heat sink 50. Mounting screws are used to connect the heat sink (and hence device 10) to a wall box (not shown.) The body assembly 20 is connected together by fasteners 2. An aesthetic cover assembly 60 is provided above the heat sink 50. The aesthetic cover assembly 60 includes a switch paddle cover 60-1 that is configured to snap into frame member 60-2. The frame 60-2 includes snap elements that are configured to be inserted into corresponding apertures in the heat sink 50. Once the aesthetic cover assembly 60 is disposed over the power regulation components (30, 40) and the device is installed, a cover plate (not shown) may be positioned over the interchangeable cover assembly 60 and fastened to heat sink 50 to complete the installation.

The back body includes openings at each corner thereof to accommodate the wiring terminals 12-18. (The reader should note that the wiring terminals are denoted as W1-W4 in FIGS. 1-3). The terminals 12-18 are used to connect the device 10 to the traveler wires and the hot and neutral wires from the electrical distribution system. The terminals 12-18 are coupled to their respective wires by the screw and pressure plate assemblies 11. The filed wires may be wired to these terminals using back wiring or side wiring techniques. The ground terminal comprises a wire 15 that is electrically connected to heat sink 50.

A switch controller 30 is provided to turn power to the load LD ON or OFF. The switch controller 30 includes a paddle switch 30-1 that is coupled to the switch contacts on traveler terminals 12 and 14 (W1 and W2) by a toggle element 30-3 and a switch spring 30-2. The toggle member 30-3 is free to rotate in the cradle formed in the middle frame 20-2. The paddle switch 30-1, of course, is configured to drive the toggle member between ON and OFF positions. The spring 30-2 is at greatest compression when the toggle member is half way between the ON and OFF positions to create a saddle point. Note that the switch itself is comprised of the contacts disposed on the toggle member 30-3 and the terminals 12 and 14 (W1 and W2, respectively). The switch is configured as a "three way switch" when the toggle member 30-3 includes contacts on either side. Although a paddle switch has been disclosed, the invention may be used in combination with other switch configurations including push button switches, magnetically operable switches, toggle switches, test switches, reset switches, and the like. As alluded to above, the switch paddle 30-1 is covered by the aesthetic switch cover 60-1 when the aesthetic cover assembly is installed over the heat sink 50. The paddle switch 30-1 has a decorative actuator 50-2 disposed in aperture 20-20 of frame 20-10.

The dimmer control 40 provides variable power to the electrical load LD. The aesthetic cover assembly 60 includes an aesthetic slider component 60-3 that is coupled to the potentiometer 40-3 by way of linkage 40-1 and 40-2. The aesthetic slider component 60-3 is, of course, accessible to the user by way of an elongated opening in frame 60-2. In an alternate embodiment of the invention (not shown), power controller 40 employs a rotary potentiometer instead of a linear potentiometer.

A printed circuit board (PCB) assembly 100 is disposed in the back body member 20-1 under the middle frame 20-2. The PCB assembly 100 may include several PCBs. The main PCB 100-1 accommodates the cradle formed in the middle frame 20-2. The capacitors C1, C4, switches S1 and S2 and the potentiometer 40-3 are mounted on, and electrically connected to PCB 100-1 as shown. Switch S1 is a push button switch whereas switch S3 is a slide switch. Both switches are coupled to actuators that are accessible to the user when the cover plate is removed. The actuators are inserted through apertures formed in the heat sink 50. The S1 aperture is less than about 0.15 inches in length whereas the S3 aperture is less than about 0.30 inches in length. The apertures are typically less than about 0.15 inches wide. The apertures are limited in size so that the heat dissipation properties of heat sink 50 are unaffected by the apertures. Lamp LED 1 is disposed on PCB 100-1 and is aligned with a light pipe 100-2. Series pass elements Q1, Q2 are thermally coupled to heat sink 50 by way of electrical insulators 100-3 and the screw/insulated shoulder assembly 50-2. The microprocessor 100-10 is disposed on PCB 100-4 which is substantially normal to PCB 100-1.

Reference is made to U.S. patent Ser. No. 13/332,948 filed on Dec. 21, 2011, which is incorporated herein by reference as though fully set forth in its entirety, for a more detailed explanation of a power control device having a switch mechanism 30, power regulation circuit 40, heat sink 50 and an aesthetic cover 60 as described herein.

Figure 5A:
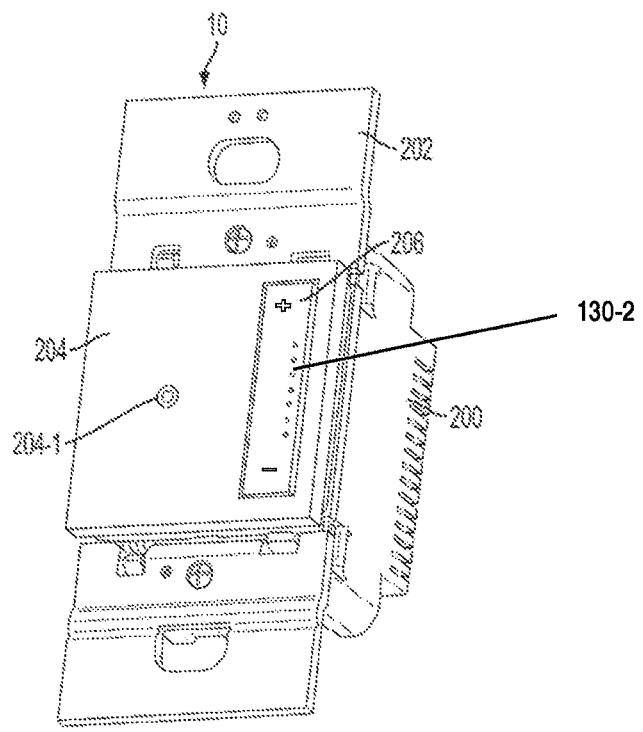
FIGS. 5A and 5B are each an exploded view of the power control device in accordance with another embodiment of the present invention.
Figure 5B:
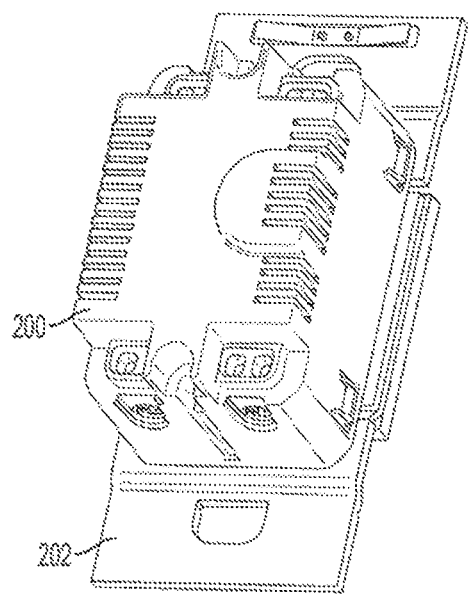

As embodied herein and depicted in FIGS. 5A and 5B, isometric views of a power control device 10 in accordance with another embodiment of the present invention are disclosed. Device 10 includes a switch cover 204 disposed on heat sink assembly 202. As before, the power handling PCB 10-1 is disposed under the heat sink 202 and within the back body member 200. FIG. 5B is a rear isometric view of the power control device depicted in FIG. 20 and shows the back body member 200 and the heat sink 202.

In this embodiment, the microcomputer 100-10 is connected to three user-operated buttons (i.e., an ON/OFF switch plate 204, a down button "−", and an up button "+"). Each button circuit is pulled to a logic high (+5V) by a 100K pull-up resistor. When a user depresses a button, its corresponding switch in the device is closed to ground the circuit such that the microcomputer 100-10 reads a logic zero (0 V) to indicate that the user has made a command. With respect to the ON/OFF button 204, if the current state of the wiring device is "OFF," an actuation of the button 204 directs the microcontroller to actuate a relay that turns the load "ON." When the user depresses the button again, the same sequence plays out and the relay turns the load "OFF." The "down button" circuit and the "up button" circuit operate in the same identical way that the ON/OFF button operates. Obviously, the difference is in the way that the microcomputer 100-10 interprets the commands. An actuation of the up-button is interpreted as a command to increase the power delivered to the load, and an actuation of the down-button is just the opposite.

In particular, when the down-button is depressed, the software in the microcontroller changes the PWM signal such that the dimmer circuit 100-4 causes the lighting load to be incrementally dimmed. (Of course, the circuit may be used to slow an electric motor, e.g., a fan motor). Conversely, when the up-button is depressed, the software in the microcontroller changes the PWM signal such that the dimmer circuit 100-4 causes the lighting load to be incrementally raised. The programming header 100-7 (FIG. 3) allows a person having the appropriate skill level to reprogram and/or debug the microcomputer 100-10 when the up and/or down buttons are depressed in a predetermined sequence. As described below, these buttons are also employed to perform the manual calibration routines described herein.

FIG. 5A also shows a linear array of LEDs disposed between the + button and the − button. In this embodiment, the microcontroller 100-10 is connected to a display circuit by a serial clock signal (SCL) and a serial data signal to provide a serial bit stream that corresponds to the appropriate device display settings. The display settings are transmitted to the display circuit when the settings are changed by a user input command and refreshed periodically. In one embodiment of the present invention, the microcomputer refreshes the settings every 300 msec, or at a 3.3 Hz rate. Of course, any suitable refreshing rate may be selected depending on the processor load.

The display circuit 130 may be implemented by an I/O expander circuit that is configured to receive the serial bit stream from the microcomputer 100-10 and convert it into a parallel data output for use by the display LEDs. In the embodiment of FIG. 5A, seven (7) bar graph LEDs are provided that provide the user with an indication of the dimmer setting. For example, if one LED is ON and the other six LEDs are OFF, the bar graph indicates to the user that the light level setting is at its lowest setting. Conversely, if all seven (7) LEDs in the bar graph 130-2 are illuminated, the dimmer is at its highest setting.

Reference is made to U.S. patent Ser. No. 13/792,566, filed on Mar. 11, 2013, which is incorporated herein by reference as though fully set forth in its entirety, for a more detailed explanation of a push button switch mechanism.

Figure 6:
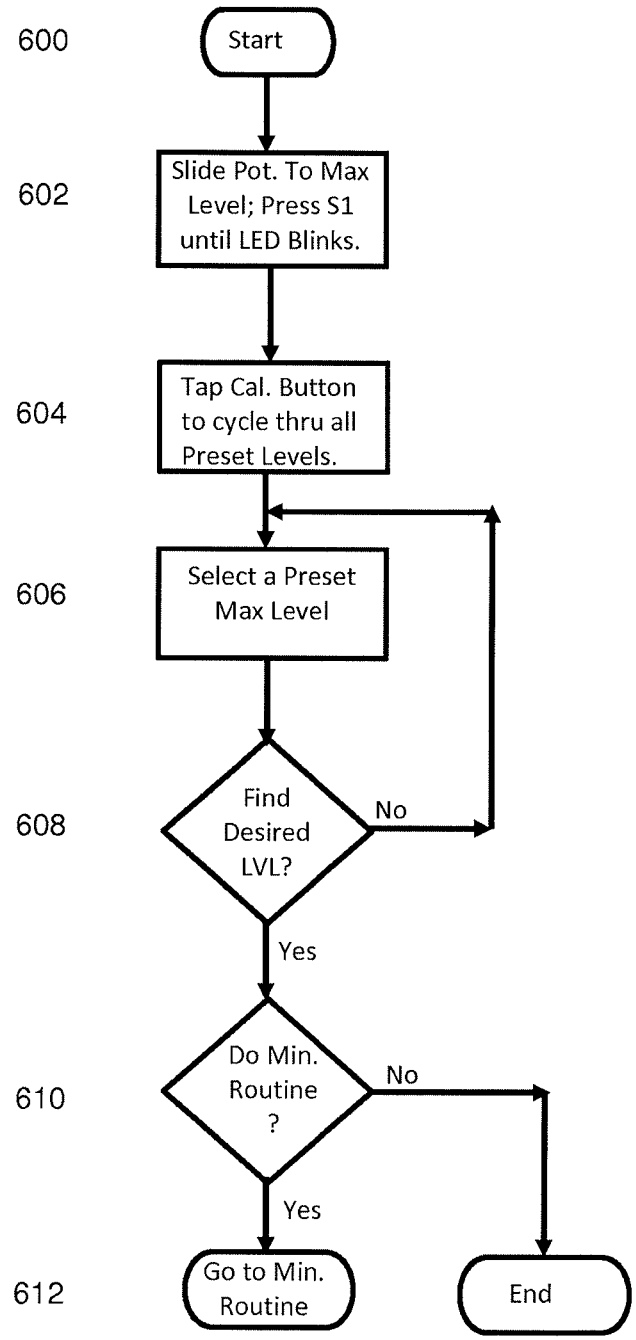
FIG. 6 is a flow chart illustrating a method for calibrating the present invention.
Figure 7:
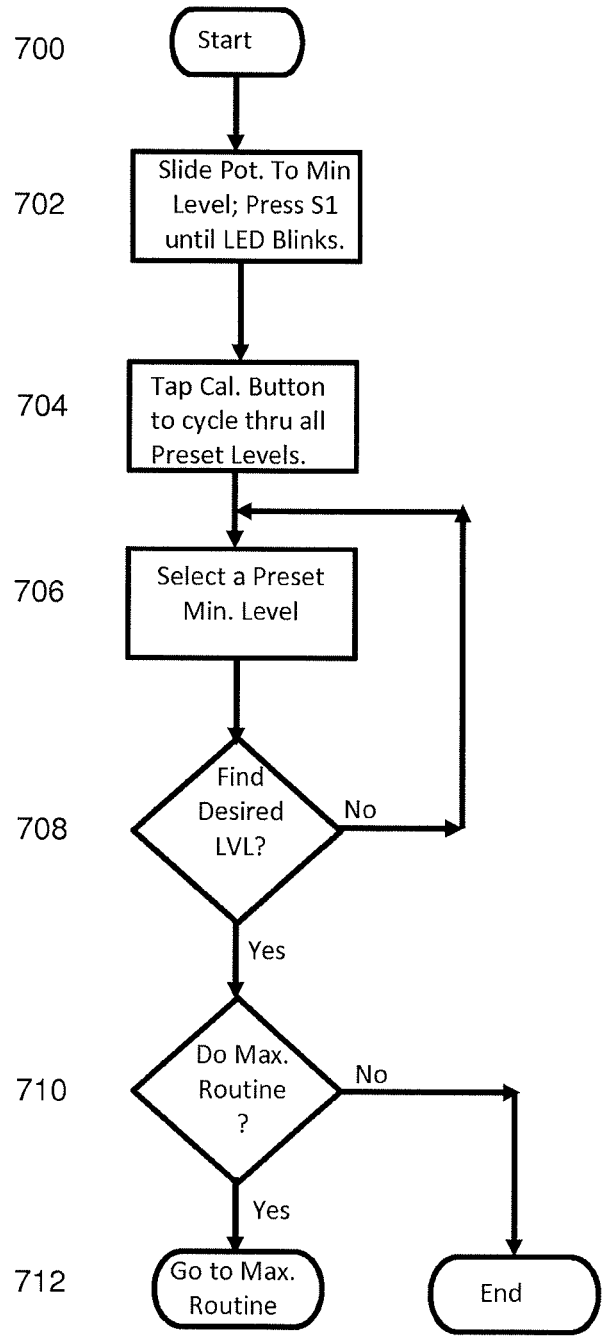
FIG. 7 is a flow chart illustrating another method for calibrating the present invention.

Referring to FIGS. 6 and 7, a method for setting maximum and minimum output voltage levels for a power control device is described. This method may be employed in the potentiometer-controlled device shown in FIGS. 1-4 or the pushbutton-controlled device depicted in FIG. 5. As described below, the following controls are present (and referred to in FIG. 6 and &) in potentiometer-controlled devices: (1) a potentiometer which sets output voltage; a (2) a calibration pushbutton (S1); a forward/reverse phase switch is provided; and at least one visual indicator is present, such as the locator LED shown in FIG. 3 (used to locate the device in a dark room). For the pushbutton-controlled devices disclosed herein the following controls are used in the calibration process: the up pushbutton that turns output voltage up; the down pushbutton that turns output voltage down; a calibration pushbutton as described above (Optionally either the up button or the down button can be used via the embedded firmware of the device); a forward/reverse phase switch is provided (if this feature is implemented in the device); a locator LED used to locate the device in a dark room; the bar graph display illustrating output voltage level; an LED illuminating the up pushbutton; and an LED illuminating the down pushbutton.

Referring to FIG. 6, a flow chart illustrating a method for calibrating in accordance with the present invention is disclosed. Specifically, the procedure below is used to set the maximum output voltage for the potentiometer controlled devices depicted in FIGS. 1-4. In step 602, the user is instructed to slide the potentiometer control 60-3 to its maximum level. The user is further instructed to press and hold the calibration button S1 until the locator LED starts blinking. When this occurs, the manual trim mode is now initialized. In step 604, the user taps the calibration pushbutton S1 to cycle through the preset settings to get a feeling for the available light levels for the type of lighting load installed in his home. Once the maximum allowed setting is reached, the next tap causes the cycle to repeat. The user can repeat this cycle as many times as he likes. In step 606, the user slides the potentiometer down to lock-in the desired maximum output voltage. In step 610, the user can continue on and do the minimum calibration routine or he can end the calibration process.

When the user calibrates the pushbutton device of FIGS. 5A-B, the user presses the up pushbutton until the up and down LEDs start to flash or blink. Once he releases the up button, the device is in maximum calibration mode. As before, the user taps the calibration pushbutton (or the up button) to cycle through the preset settings for maximum output voltage. When the maximum allowed setting is reached, the next tap of the calibration button returns to the minimum allowed setting for maximum output voltage to repeat the cycle (604). In steps 606-608, once the desired maximum output voltage is reached, the user can tap either the up or down pushbutton to lock in this setting. IF the up button is being used to calibrate, then a tap on the down button locks in the desired setting.

FIG. 7 is a flow chart illustrating another method for calibrating the present invention. Specifically, FIG. 7 illustrates the procedure for calibrating the minim setting. In step 702, the user is instructed to slide the potentiometer control 60-3 to its minimum level. The user is further instructed to press and hold the calibration button S1 until the locator LED starts blinking. When this occurs, the manual trim mode is now initialized. In step 704, the user taps the calibration pushbutton S1 to cycle through the preset settings to get a feeling for the available minimum light levels for the type of lighting load installed in his home. Once the maximum allowed setting is reached, the next tap causes the cycle to repeat. The user can repeat this cycle as many times as he likes until he settles on one he prefers. In step 706, the user slides the potentiometer down to lock-in the desired minimum output voltage. In step 710, the user can continue on and do the maximum calibration routine described above or he can end the calibration process.

When the pushbutton device of FIGS. 5A-B is being calibrated, the user presses and holds the down pushbutton until the up and down LEDs start to flash. Manual trim mode is now initialized. Tap the CAL pushbutton to cycle through the preset settings for minimum output voltage. In step 704, when the maximum allowed setting is reached, the next tap returns to the minimum allowed setting for minimum output voltage, and the cycle can be repeated. When the desired minimum output voltage is reached in steps 706-708, the user taps either the UP or DOWN pushbutton to lock in this setting. In addition to locking in the minimum voltage level, a current sensor reading is established which is later used for determining whether the load is turned ON or OFF.

In another embodiment of the invention, the bar graph display will light at max level before the up and down LEDs start to flash. If the down button is released at this point, the system will initiate a reset and the device will perform a manual calibration.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed:

1. An electrical wiring device comprising:
a housing assembly including a plurality of terminals at least partially disposed therein, the plurality of terminals being configured to be coupled to an AC power source and at least one electrical load, the plurality of terminals being configured to provide the at least one electrical load with regulated AC power in a device energized state;
at least one variable control mechanism coupled to the housing assembly, the at least one variable control mechanism including a control knob being user settable between a first adjustment stop and a second adjustment stop;
a user accessible calibration button;
at least one series pass element coupled to the at least one variable control mechanism, the at least one series pass element being configured to regulate load power to the at least one electrical load in accordance with a user setting of the control knob, wherein the series pass element is configured to regulate the load power from a minimum load power when the control knob is at or near the first adjustment stop to a first maximum load power when the control knob is at or near the second adjustment stop;
a regulation circuit coupled to the user accessible calibration button and the at least one series pass element, the regulation circuit being configured to enter a calibration mode when the control knob is at or near the second adjustment stop and the user manually actuates the calibration button, the regulation circuit associating the second adjustment stop with at least one pre-determined second maximum load power when the calibration button is actuated and when the regulation circuit is in the calibration mode, wherein the second maximum load power is different from the first maximum load power; and
a receiver module coupled to the regulation circuit configured to relay control signals issued by a wireless remote device, wherein the receiver module is configured to communicate with the wireless remote device through one or more of the following communication methods comprising wifi, satellite, radio frequency (RF), infrared (IR), light, microwave, mobile network, bluetooth, bluetooth low energy (BLE), and voice.

2. The device of claim 1, wherein the variable control mechanism is a slide potentiometer or a rotary potentiometer.

3. The device of claim 1, wherein the variable control mechanism is an input received from the wireless remote device.

4. The device of claim 1, wherein the electrical wiring device is configured to accommodate a wall plate, the calibration button being accessible to the user when the wall plate is removed.

5. The device of claim 1, wherein the electrical wiring device is configured to be calibrated remotely.

6. The device of claim 1, wherein the series pass element includes a thyristor, a triac, an SCR, or a MOSFET.

7. The device of claim 1, wherein the regulation circuit provides a sequence loop of pre-determined minimum load power settings, the user being able to step through the sequence loop and select one of the minimum load power settings by depressing the calibration button.

8. The device of claim 1, wherein the regulation circuit provides a sequence loop of pre-determined minimum load power settings, the user being able to step through the sequence loop and select one of the minimum load power settings by selecting a value using the wireless remote device.

9. The device of claim 7, wherein the electrical wiring device is configured to accommodate a wall plate, the calibration button being accessible to the user when the wall plate is removed.

10. The device of claim 8, wherein the electrical wiring device is configured to be calibrated remotely.

11. The device of claim 1, wherein the regulation circuit provides a sequence loop of pre-determined maximum load power settings, the user being able to step through the sequence loop and select one of the maximum load power settings by depressing the calibration button.

12. The device of claim 1, wherein the regulation circuit provides a sequence loop of pre-determined maximum load power settings, the user being able to step through the sequence loop and select one of the maximum load power settings by selecting a value using the wireless remote device.

13. The device of claim 11, wherein the electrical wiring device is configured to accommodate a wall plate, the calibration button being accessible to the user when the wall plate is removed.

14. The device of claim 13, wherein the electrical wiring device is configured to accommodate a wall plate, the calibration button being accessible to the user when the wall plate is not removed.

15. The device of claim 12, wherein the electrical wiring device is configured to be calibrated remotely.

16. The device of claim 1, wherein the regulation circuit includes a memory element, the memory element being configured to store a plurality of minimum load power settings and a plurality of maximum load power settings that are user selectable via the position of the control knob and use of the calibration button.

17. The device of claim 1, wherein the regulation circuit includes a memory element, the memory element being configured to store a plurality of minimum load power settings and a plurality of maximum load power settings that are user selectable via selecting a value using the wireless remote device.

18. The device of claim 15, further including an electrical switch coupled to the housing assembly, the electrical switch including a plurality of switch contacts in series with the user series pass element and the at least one electrical load.

19. The device of claim 1, wherein entering the calibration mode requires the calibration button to be held down for a pre-determined period of time.

20. The device of claim 1, wherein entering the calibration mode requires selecting a value using the wireless remote device.

21. The device of claim 1, wherein the regulation circuit includes a memory element, the regulation circuit being configured to automatically select a predetermined minimum load power setting from a plurality of minimum load power settings stored in the memory element, the user being able to manually substitute another from the plurality of minimum load power settings through manipulation of the control knob and the calibration button.

22. The device of claim 1, wherein the regulation circuit includes a memory element, the regulation circuit being configured to automatically select a predetermined minimum load power setting from a plurality of minimum load power settings stored in the memory element, the user being able to manually substitute another from the plurality of minimum load power settings through selecting a value using the wireless remote device.

23. The device of claim 20, further including a current sensor coupled to the regulation circuit, the current sensor providing an output signal based on the amount of current flowing through the at least one electrical load, the regulation circuit automatically selecting one of the predetermined minimum load power settings based on the output signal.

24. The device of claim 20, wherein the regulation circuit is configured to automatically select a predetermined maximum load power setting from a plurality of maximum load power settings stored in the memory element, the user being able to manually substitute another from the plurality of maximum load power settings through manipulation of the control knob and the calibration button.

25. The device of claim 1, wherein the regulation circuit is configured to automatically select a predetermined maximum load power setting from a plurality of maximum load power settings stored in the memory element, the user being able to manually substitute another from the plurality of maximum load power settings through selecting a value using the wireless remote device.

26. The device of claim 1, wherein the regulation circuit includes a memory element, the regulation circuit being configured to automatically select a predetermined maximum load power setting from a plurality of maximum load power settings stored in the memory element, the user being able to manually select a different maximum load power setting through manipulation of the control knob and the calibration button.

27. The device of claim 1, wherein the regulation circuit includes a memory element, the regulation circuit being configured to automatically select a predetermined maximum load power setting from a plurality of maximum load power settings stored in the memory element, the user being able to manually select a different maximum load power setting through selecting a value using the wireless remote device.

28. The device of claim 25, further including a current sensor coupled to the regulation circuit, the current sensor providing an output signal based on the amount of current flowing through the at least one electrical load, the regulation circuit automatically selecting one of the predetermined maximum load power settings based on the output signal.

29. The device of claim 1, wherein the device exits the calibration mode when the control knob is moved by the user.

30. The device of claim 1, wherein the device exits the calibration mode when a value is selected using the wireless remote device.

31. The device of claim 1, wherein the receiver is in direct communication with a communication interface, where communication interface includes a wireless router.

32. The device of claim 1, wherein the receiver is in direct communication with the wireless remote device.

33. The device of claim 1, wherein the wireless remote is a smart device, where the smart device uses an app to input settings from user.

34. An electrical wiring device comprising:
a housing assembly including a plurality of terminals at least partially disposed therein, the plurality of terminals being configured to be coupled to an AC power source and at least one electrical load, the plurality of terminals being configured to provide the at least one electrical load with regulated AC power in a device energized state;
at least one variable control mechanism coupled to the housing assembly, the at least one variable control mechanism being user settable between a first adjustment stop and a second adjustment stop;
a calibration mechanism;
at least one series pass element coupled to the at least one variable control mechanism, the at least one series pass element being configured to regulate load power to the at least one electrical load in accordance with a user setting of the at least one variable control mechanism, wherein the series pass element is configured to regulate the load power from a minimum load power to a first maximum load power;
a regulation circuit coupled to the calibration mechanism and the at least one series pass element, the regulation circuit being configured to enter a calibration mode when the load power is at or near the first maximum load power and the calibration mechanism is remotely actuated by a user, the regulation circuit associating the remote actuation of the calibration mechanism by a user with at least one pre-determined second maximum load power when the regulation circuit is in the calibration mode, wherein the second maximum load power is different from the first maximum load power; and a receiver module coupled to the at least one of the variable control mechanism, the calibration mechanism, at least one series pass element, and the regulation circuit, and configured to relay control signals issued by a wireless remote device, wherein the receiver module is configured to communicate with the wireless remote device through one or more of the following communication methods comprising wifi, satellite, radio frequency (RF), infrared (IR), light, microwave, mobile network, bluetooth, bluetooth low energy (BLE), and voice.

35. The device of claim 34, wherein the variable control mechanism is a slide potentiometer or a rotary potentiometer.

36. The device of claim 34, wherein the variable control mechanism is an input received from the wireless remote device.

37. The device of claim 34, wherein the electrical wiring device is configured to accommodate a wall plate, the calibration button being accessible to the user when the wall plate is removed.

38. The device of claim 34, wherein the electrical wiring device is configured to accommodate a wall plate, the calibration button being accessible to the user when the wall plate is not removed.

39. The device of claim 34, wherein the electrical wiring device is configured to be calibrated remotely.

40. The device of claim 34, wherein the series pass element includes a thyristor, a triac, an SCR, or a MOSFET.

41. The device of claim 34, wherein the regulation circuit provides a sequence loop of pre-determined minimum load power settings, the user being able to step through the sequence loop and select one of the minimum load power settings by depressing the calibration button.

42. The device of claim 34, wherein the regulation circuit provides a sequence loop of pre-determined minimum load power settings, the user being able to step through the sequence loop and select one of the minimum load power settings by selecting a value using the wireless remote device.

43. The device of claim 39, wherein the electrical wiring device is configured to accommodate a wall plate, the calibration button being accessible to the user when the wall plate is removed.

44. The device of claim 43, wherein the electrical wiring device is configured to accommodate a wall plate, the calibration button being accessible to the user when the wall plate is not removed.

45. The device of claim 42, wherein the electrical wiring device is configured to be calibrated remotely.

46. The device of claim 34, wherein the regulation circuit provides a sequence loop of pre-determined maximum load power settings, the user being able to step through the sequence loop and select one of the maximum load power settings by depressing the calibration button.

47. The device of claim 34, wherein the regulation circuit provides a sequence loop of pre-determined maximum load power settings, the user being able to step through the sequence loop and select one of the maximum load power settings by selecting a value using the wireless remote device.

48. The device of claim 43, wherein the electrical wiring device is configured to accommodate a wall plate, the calibration button being accessible to the user when the wall plate is removed.

49. The device of claim 47, wherein the electrical wiring device is configured to accommodate a wall plate, the calibration button being accessible to the user when the wall plate is not removed.

50. The device of claim 47, wherein the electrical wiring device is configured to be calibrated remotely.

51. The device of claim 34, wherein the regulation circuit includes a memory element, the memory element being configured to store a plurality of minimum load power settings and a plurality of maximum load power settings that are user selectable via the position of the at least one variable control mechanism and use of the calibration button.

52. The device of claim 34, wherein the regulation circuit includes a memory element, the memory element being configured to store a plurality of minimum load power settings and a plurality of maximum load power settings that are user selectable via selecting a value using the wireless remote device.

53. The device of claim 49, further including an electrical switch coupled to the housing assembly, the electrical switch including a plurality of switch contacts in series with the user series pass element and the at least one electrical load.

54. The device of claim 34, wherein entering the calibration mode requires the calibration button to be held down for a pre-determined period of time.

55. The device of claim 34, wherein entering the calibration mode requires selecting a value using the wireless remote device.

56. The device of claim 34, wherein the regulation circuit includes a memory element, the regulation circuit being configured to automatically select a predetermined minimum load power setting from a plurality of minimum load power settings stored in the memory element, the user being able to manually substitute another from the plurality of minimum load power settings through manipulation of the at least one variable control mechanism and the calibration button.

57. The device of claim 34, wherein the regulation circuit includes a memory element, the regulation circuit being configured to automatically select a predetermined minimum load power setting from a plurality of minimum load power settings stored in the memory element, the user being able to manually substitute another from the plurality of minimum load power settings through selecting a value using the wireless remote device.

58. The device of claim 54, further including a current sensor coupled to the regulation circuit, the current sensor providing an output signal based on the amount of current flowing through the at least one electrical load, the regulation circuit automatically selecting one of the predetermined minimum load power settings based on the output signal.

59. The device of claim 54, wherein the regulation circuit is configured to automatically select a predetermined maximum load power setting from a plurality of maximum load power settings stored in the memory element, the user being able to manually substitute another from the plurality of maximum load power settings through manipulation of the at least one variable control mechanism and the calibration button.

60. The device of claim 34, wherein the regulation circuit is configured to automatically select a predetermined maximum load power setting from a plurality of maximum load power settings stored in the memory element, the user being able to manually substitute another from the plurality of maximum load power settings through selecting a value using the wireless remote device.

61. The device of claim 34, wherein the regulation circuit includes a memory element, the regulation circuit being configured to automatically select a predetermined maximum load power setting from a plurality of maximum load power settings stored in the memory element, the user being able to manually select a different maximum load power setting through manipulation of the at least one variable control mechanism and the calibration button.

62. The device of claim 34, wherein the regulation circuit includes a memory element, the regulation circuit being configured to automatically select a predetermined maximum load power setting from a plurality of maximum load power settings stored in the memory element, the user being able to manually select a different maximum load power setting through selecting a value using the wireless remote device.

63. The device of claim 59, further including a current sensor coupled to the regulation circuit, the current sensor providing an output signal based on the amount of current flowing through the at least one electrical load, the regulation circuit automatically selecting one of the predetermined maximum load power settings based on the output signal.

64. The device of claim 34, wherein the device exits the calibration mode when the at least one variable control mechanism is moved by the user.

65. The device of claim 34, wherein the device exits the calibration mode when a value is selected using the wireless remote device.

66. The device of claim 34, wherein the receiver is in direct communication with a communication interface, where communication interface includes a wireless router.

67. The device of claim 34, wherein the receiver is in direct communication with the wireless remote device.

68. The device of claim 34, wherein the wireless remote is a smart device, where the smart device uses an app to input settings from user.

69. An electrical wiring device comprising:
- a housing assembly including a plurality of terminals at least partially disposed therein, the plurality of terminals being configured to be coupled to an AC power source and at least one electrical load, the plurality of terminals being configured to provide the at least one electrical load with regulated AC power in a device energized state;
- at least one variable control mechanism coupled to the housing assembly, the at least one variable control mechanism being user settable between a first adjustment stop and a second adjustment stop;
- a calibration mechanism;
- at least one series pass element coupled to the at least one variable control mechanism, the at least one series pass element being configured to regulate load power to the at least one electrical load in accordance with a user setting of the at least one variable control mechanism, wherein the series pass element is configured to regulate the load power from a first minimum load power to a first maximum load power;
- a regulation circuit coupled to the calibration mechanism and the at least one series pass element, the regulation circuit being configured to enter a calibration mode when the load power is at or near the first minimum load power and the calibration mechanism is remotely actuated by a user, the regulation circuit associating the remote actuation of the calibration mechanism by a user with at least one pre-determined second minimum load power when the regulation circuit is in the calibration mode, wherein the second minimum load power is different from the first minimum load power; and
- a receiver module coupled to the at least one of the variable control mechanism, the calibration mechanism, at least one series pass element, and the regulation circuit, and configured to relay control signals issued by a wireless remote device, wherein the receiver module is configured to communicate with the wireless remote device through one or more of the following communication methods comprising wifi, satellite, radio frequency (RF), infrared (IR), light, microwave, mobile network, bluetooth, bluetooth low energy (BLE), and voice.

70. The device of claim 1, wherein the electrical wiring device is configured to accommodate a wall plate, the calibration button being accessible to the user when the wall plate is not removed.

71. The device of claim 9, wherein the electrical wiring device is configured to accommodate a wall plate, the calibration button being accessible to the user when the wall plate is not removed.

* * * * *